United States Patent Office 3,303,096
Patented Feb. 7, 1967

3,303,096
PROCESS FOR PREPARING HIGH MOLECULAR WEIGHT PRODUCTS OF APATHOGENIC ANAEROBIC CULTURES

Heinz Feier, Lorsbach, Taunus, Dietmar Gericke, Frankfurt am Main, Georg Nesemann, Lorsbach, Taunus, and Paul Präve, Hofheim, Taunus, Germany, assignors to Farbwerke Hoechst Aktiengesellschaft vormals Meister Lucius & Bruning, Frankfurt am Main, Germany, a corporation of Germany No Drawing. Filed Sept. 21, 1964, Ser. No. 398,088
Claims priority, application Germany, Sept. 25, 1963, F 40,829
12 Claims. (Cl. 167—78)

It is known that from gram-negative aerobic bacteria and from the filtrates of their cultures substances can be isolated which increase the unspecific resistance of the animal and human organism.

These substances are high molecular weight lipopolysaccharides which are strongly pyrogenic and toxic. In the administration of these compounds, one can observe that a negative phase with a reduction of the resistance precedes the increase of the resistance, which renders the products unsuitable for pharmaceutical purposes.

It has hitherto not been possible to isolate substances that have an action on the unspecific resistance from gram-positive aerobic bacteria. In the culture filtrates of gram-positive aerobes, only substances which promote the emigration of leukocytes and which are effective in inflammations caused by gram-positive aerobic bacteria have been found.

Now, we have found that high molecular weight substances which increase the resistance of the organism without previously reducing it and which do not increase body temperature can be isolated from culture filtrates of the cultures of apathogenic anaerobic bacteria. It was surprising that these substances obtained from culture filtrates of apathogenic anaerobic bacteria do not possess the disadvantageous effects of the lipopolysaccharides obtained from gram-negative bacteria.

As apathogenic, anaerobic bacteria which may be used in the process of the present invention, there may be used in the first instance clostridia. Among these, there may be mentioned, by way of example, *Clostridium butyricum* (ATCC No. 13 732), *Clostridium pectinoverum* (NB 1386), *Clostridium tyrobutyricum* (McClung 1750), and *Clostridium acetobutylicum* (McClung 632).

The above-mentioned bacteria are cultivated in the manner usual for anaerobes, for example in standing flasks or in fermenters such as those used for the preparation of antibiotics. As nutrient media, the usual nutrient media for anaerobes which contain either a reducing agent such as ascorbic acid or iron nails are used, or such nutrient media in which the oxygen has been replaced by an inert gas, for example those through which nitrogen is passed.

The culture is allowed to grow for about 3 to 21 days, the culture media being kept at a temperature in the range of 20 and 40° C., preferably at about 37° C. As a rule, the germs have formed spores after this period.

The bacteria are separated in known manner, for example by centrifugation or filtration, from these anaerobe cultures, so that sterile culture filtrates are obtained. Further isolation and purification of the active products contained in these culture filtrates can be carried out by dialysis and/or by precipitation with solvents.

In dialysis, the active products remain in the inner dialysate since they are not dialyzable.

A further purification, which often also brings about an increase in activity, can be effected by precipitation of the accompanying substances or by precipitation of the active products themselves by means of suitable solvents.

If water-miscible lower aliphatic alcohols, for example, methanol, ethanol or propanol, are used as solvents, the active substances remain in solution and can be separated with the solution from the precipitated accompanying substances. The purification with alcohols is preferably carried out by adding a twofold or tenfold, preferably a five-fold, quantity of alcohol to the culture filtrate or to its dialysate, which, if desired, may previously be concentrated. The precipitate is then separated and discarded and the liquid phase is concentrated to isolate the active substance. It is advantageous to carry out this operation under reduced pressure.

If water-miscible ketones such as acetones or methylethyl ketone are used as solvents, the active products are precipitated and the accompanying substances remain in solution. In this case it is advantageous to add a considerable excess of ketone, for example an excess of about one hundredfold the volume of the culture filtrate or its dialysate. The latter is preferably concentrated beforehand. The precipitated solids are separated, dried if desired or required, and redissolved in water if desired. By successive application of the above-described purification methods, it is possible to purify the active substances to a large extent.

The high molecular weight substances obtained by the process of the present invention are distinguished by the fact that they increase the resistance, in particular the resistance to infections, without being pyrogenic or toxic or causing a reduction of the bactericidal potency of the serum. In addition, repeated administration of the substances does not cause sensitization of the organism treated. The Shwartzmann-Sanarelli phenomenon, which always appears upon application of the lipopolysaccharides from gram negative spores mentioned in the introductory part of this specification, does not appear after application of the products of the invention. An anaphylactic shock is likewise not observed.

The following tests, the results of which are disclosed in the subsequently following examples, are suitable for characterizing the substances:

(1) *Test for bactericidal potency of serum* (modified according to H. Franck).—For determining the bactericidal potency of the serum, mice that have a weight of 20 g. are intraperitoneally (i.p.) injected with the test substance. Blood is taken prior to the injection and at predetermined times, about 4, 16 and 24 hours, after the injection from the retro-orbital plexuses. The serum obtained from the blood taken from 6 mice is combined to a serum pool, diluted with a physiological salt solution in a ratio of 1:10 and divided into two equal parts. One part is inactivated at 80° C., whereas the other part remains active. To both samples is then added a quantity, corresponding to half the volume of the samples, of a suspension of *Bacillus subtilis* spores which have been cultivated synchronously and thus constitute a so-called "synchronous culture," i.e., a culture which has in each unit of volume the same number of cells (for example, $8\times10^6$ spores per ml.). Thus, one active and one inactive sample of serum are then available for measuring the growth of *B. subtilis* spores in the presence of serum.

The growth of the *Bacillus subtilis* spores in the untreated and in the treated serum is then determined manometrically by measurement of the oxygen consumption with a Warburg apparatus. 2.0 ml. of serum—subtilis suspension are introduced by means of a pipette into the main space of each vessel of this apparatus and 0.1 ml. of a 10% potassium hydroxide solution are introduced into the central part of each vessel. The oxygen consumption is measured at intervals of 30 minutes and at 37° C., an amplitude of 3 cm. and a frequency of 50 rev./min. The decrease of the pressure in the vessel is plotted linearly against the time of the test and gives thus the breathing curves of the subtilis spores. If the test substance causes an increase of the bactericidal potency of the serum, the oxygen consumption rises rapidly, first in the inactivated sample (INA) and after a certain period of time, in the active sample (A). The difference in time between these increases in the oxygen consumption, expressed in minutes, represents the inhibition of the growth due to increased bactericidal action of the serum. A quotient, $Q_{SB}$, is formed between the difference $(INA-A)$ for a control sample and the difference $(INA-A)$ for a test sample:

$$\frac{(INA-A)_{control}}{(INA-A)_{test\ sample}}=\frac{t_1}{t}=Q_{SB}$$

The control sample is prepared from blood taken prior to injection of the test substance and permits measurement of the normal bactericidal potency of the serum. The test sample is prepared from blood taken after administration of the test sample. The greater the bactericidal action of the substance tested, the smaller is the values of $Q_{SB}$, i.e., the resistance of the serum per se has been increased by the presence of resistance-increasing substances. Inactive substances show a value of $Q_{SB} \approx 1.0$, and $Q_{SB} > 1$ means that the test substance reduces the bactericidal potency of the serum.

(2) *Infection test.*—Each animal of groups of 10 to 20 mice (weight of each animal about 20 g.) is injected intraperitoneally with 1×5 or 10 gamma of test substance. Control animals are given the same amount of physiological salt solution. 24 hours after injection of the test substance, a hemolyzing Staphylococcus strain is injected intravenously into the animals for infection in such a dose that about 50% of the control animals die. The number of surviving animals is determined on each of the subsequently following 17 days.

The following examples illustrate the invention but they are not intended to limit it thereto:

EXAMPLE 1

(a) *Cultivation of anaerobic apathogenic Clostridium strain*

α-*Prestage culture.*—An Erlenmeyer flask was charged with 150 ml. of a nutrient solution consisting of

|  | Percent |
|---|---|
| Meat peptone | 22 |
| Yeast extract | 0.5 |
| Meat extract | 0.25 |
| Sodium chloride | 0.25 |
| Iron nails | 1 |
| Tap water (pH-value 7.2). | |

The solution was innoculated with lyophilized spores of *Clostridium butyricum* from an ampule and then covered with sterile paraffin oil. After incubation for 24 hours, at 37° C., the solution showed a good growth of spores.

*β-Mainstage culture.*—Erlenmeyer flasks having a capacity of 2 liters were charged with 1.5 l. of a nutrient solution consisting of

| | Percent |
|---|---|
| Casein peptone | 0.5 |
| Soya peptone | 0.3 |
| Cane sugar | 0.5 |
| L-lysine | 0.05 |
| NaCl | 0.5 |
| Sec. potassium phosphate | 0.25 |
| Iron nails (in bags) | 1 | and sterilized for 20 minutes at 121° C. in an autoclave. Immediately after cooling, each of the solutions was inoculated with 50 ml. of the above prestage culture which was withdrawn by means of a pipette below the paraffin oil. After incubation for 12 days at 37° C., 72% of the bacteria had formed spores, 5% showed beginning spore formation and the rest consisted of rods.

(b) *Recovery of the active substances*

2 liters of Clostridia culture were clarified in a centrifuge (system "Cepa Sharples") and then filtered with suction through a degerminating layer. The filtrate was covered with toluene in order to prevent growth of bacteria and then dialyzed in a dialysis bag for 24 to 72 hours against flowing distilled water. The solution was then freeze-dried. Yield: 10 g.

4 g. of the product were dissolved in 30 cc. of water and 150 cc. of ethyl alcohol were added while stirring. The substance which had precipitated was again dissolved in 30 cc. of water and 150 cc. of ethyl alcohol were added while stirring. The precipitated substance showed no activity. The combined alcohol phases were concentrated under reduced pressure and gave a brown oil. Yield 2.04 g.

(c) *Test for the bactericidal potency of the serum*

When mice were treated with 5 gamma i.p. of the substance obtained according to (b), and blood was taken 16 hours after the injection, the test for the bacteridical potency of the serum gave a $Q_{SB}$-value of 0.3.

Whereas lipopolysaccharide obtained from *Escherichia coli* after 4 hours causes a decrease of the bactericidal potency of the serum (so-called negative phase) with a $Q_{SB}$-value of 1.2, the preparation according to (b) in the same test does not provoke such a decrease: with 10 gamma i.p., a $Q_{SB}$-value of 0.7 and with 5 gamma i.p. a $Q_{SB}$-value of 0.6 were found.

(d) *Infection test*

10 mice were given each 10 gamma i.p. o fthe substance obtained according to (b) in 0.4 cc. of water and 24 hours later infected by intravenous injection of *Staphylococcus aureus*. Control animals were given the same quantity of physiological salt solution. The following table shows the survival rate of the test animals as a function of time:

TABLE 1

[Survival rate of mice in the infection test]

| Days after infection | Number of surviving animals treated with 10 gamma of the substance obtained according to (b) | Untreated control animals |
|---|---|---|
| 0 | 10 | 10 |
| 1 | 9 | 8 |
| 2 | 9 | 6 |
| 3 | 9 | 6 |
| 4 | 9 | 6 |
| 5 | 8 | 5 |
| 6 | 7 | 3 |
| 7 | 7 | 2 |
| 8 | 7 | 2 |
| 9 | 7 | 2 |
| 10 | 7 | 2 |
| 11 | 7 | 2 |
| 12 | 6 | 2 |
| 13 | 6 | 2 |
| 14 | 6 | 2 |
| 15 | 6 | 2 |
| 16 | 6 | 2 |
| 17 | 6 | 1 |

The table shows that the death rate of the animals treated with the preparation of the invention is lower than that of the untreated control animals, i.e. that the survival rate has been increased.

(e) *Pyrogenicity*

The preparation obtained according to (b) is non-pyrogenic in rabbits at 50 gamma/kg. s.c.

(f) Toxicity

A toxicity of the preparation could not be found. The $LD_{50}$ in mice is higher than 2 g./kg.

EXAMPLE 2

(a) *Cultivation of an apathogenic Clostridium strain*

α-*Prestage culture.*—Erlenmeyer flasks having a capacity of 300 cc. were charged with 150 ml. of a nutrient solution consisting of

|  | Percent |
|---|---|
| Starch | 0.5 |
| Casein peptone | 2 |
| Meat extract | 0.5 |
| Yeast extract | 0.5 |
| NaCl | 0.25 | and then sterilized. The solutions were then inoculated with 5 ml. of an iron nail culture of *Clostridium butyricum* which showed good spore formation. The flasks were then placed in an exsiccator which was evacuated and then filled with nitrogen. The tightly closed exsiccator was then stored in an incubator at 37° C. After 12–18 hours, the nitrient solution was densely overgrown with vegetative rods. These solutions served as the inoculation material for the mainstage culture.

*β-Mainstage culture.*—Fermenters provided with an air inlet, a sample withdrawal device and an inoculation nipple, were charged with 15 liters of a nutrient solution consisting of

| | Percent |
|---|---|
| Cane sugar | 0.5 |
| Casein peptone | 2 |
| Meat extract | 0.1 |
| L-lysine | 0.05 |
| KCl | 0.25 |
| $FeSO_4$ | 0.006 |
| Distilled water. | | having a pH-value in the range of 7.6–7.8, and sterilized. The solution was then inoculated with 150 ml. of the above prestage culture and incubated at 37° C., while slowly passing nitrogen therethrough. After 10 days, 85% of the strain had formed spores.

(b) *Recovery of the active substances*

12 liters of Clostridia culture were centrifuged and completely clarified by filtration. After dialysis of this culture filtrate for 24–72 hours under toluene, the solution was concentrated to 300 cc. under reduced pressure and 1.5 l. of ethanol were added with stirring.

The precipitate was taken up in 150 cc. of water and again combined, while stirring, with 750 cc. of ethanol and then centrifuged. The precipitate showed a weak action. Both ethanol phases were combined and concentrated under reduced pressure to 150 cc. 15 liters of acetone were added, while stirring; the whole was then centrifuged. The precipitate separated by centrifugation was washed with ether and dried in an exsiccator. Yield: 3.91 g.

(c) *Test for the bactericidal potency of the serum*

Upon application of 5 gamma of the active substance, the $Q_{SB}$-value was 0.3 after 16 hours, and upon application of 1 gamma the $Q_{SB}$-value was likewise 0.3. After 4 hours, the respective values were 0.3 and 0.6. For comparison, the activity of a lipopolysaccharide from *Escherichia coli*, which upon application of a dose of 3 gamma gave a $Q_{SB}$-value of 1.2, was also measured.

(d) *Infection test*

10 mice were treated intraperitoneally with 5 gamma of the substance obtained according to (b) in 0.5 cc. of water, 24 hours prior to intravenous infection with *Staphlococcus aureus*. Control animals were given the same amount of physiologic salt solution. The following table shows the survival rate of the animals.

TABLE 2

| Days after infection | Number of surviving animals treated with 5 gamma of the substance obtained according to (b) | Untreated control animals |
|---|---|---|
| 0 | 10 | 10 |
| 1 | 10 | 10 |
| 2 | 8 | 7 |
| 3 | 8 | 6 |
| 4 | 8 | 4 |
| 5 | 7 | 3 |
| 6 | 7 | 3 |
| 7 | 7 | 2 |
| 8 | 6 | 1 |
| 9 | 6 | 1 |
| 10 | 5 | 1 |
| 11 | 5 | 1 |
| 12 | 5 | 1 |
| 13 | 5 | 1 |
| 14 | 5 | 1 |
| 15 | 4 | 1 |
| 16 | 3 | 1 |
| 17 | 3 | 1 |

(e) *Pyrogenicity*

The preparation obtained according to (b) is non-pyrogenic in rabbits at 100 and 200 gamma/kg. i.v.

(f) *Toxicity*

A toxicity of the preparation could not be found. The $LD_{50}$ in mice is above 10 g./kg.

EXAMPLE 3

(a) *Cultivation of an apathogenic Clostridium strain*

*α-Prestage culture.*—Erlenmeyer flasks having a capacity of 500 cc. were filled with 300 cc. of a nutrient solution consisting of

| | Percent |
|---|---|
| Cane sugar | 0.5 |
| Casein peptone | 2 |
| Meat extract | 0.1 |
| L-lysine | 0.05 |
| NaCl | 0.25 |
| pH 7.0. | | and sterilized in an autoclave. After cooling, 0.1% of Na-ascorbate, dissolved in distilled water and filtered under sterile conditions through a Seitz filter, was added in order to reduce the Redox potential. The solution was then inoculated with spores of *Clostridium tyrobutyricum* and incubated for 120 hours at 37° C. The spore formation was then about 85%. The vegetative bacteria were then destroyed by heating for half an hour to 80° C.

*β-Mainstage culture.*—Fermenters filled with 15 liters of the following nutrient solution

| | Percent |
|---|---|
| Casein peptone | 2 |
| Meat extract | 0.1 |
| L-lysine | 0.05 |
| KCl | 0.25 |
| $FeSO_4$ | 0.006 | were inoculated with spores as described in Example 2. Then, 0.5% of cane sugar, dissolved separately in distilled water and sterilized in an autoclave, and 0.05% of ascorbic acid, dissolved in distilled water and filtered under sterile conditions through a bacteria filter, were added. After an incubation for 7 days at 37° C., 90% of the bacteria had formed spores, so that the solution could be harvested.

(b) *Recovery of the active substances*

15 liters of Clostridia culture were centrifuged and filtered. The clear filtrate was concentrated under reduced pressure to 500 cc. and dialyzed under toluene for 3 days against flowing distilled water. The dialyzed culture solution was then concentrated under reduced pressure to 150 cc. and combined, while stirring, with 750 cc. of ethanol. The precipitate was again dissolved in 150 cc. of water, combined, while stirring, with 750 cc. of ethanol and centrifuged. Both alcohol solutions were combined and concentrated under reduced pressure. The oil obtained thereby was taken up in water and freeze-dried. Yield: 11.71 g.

(c) *Test for the bactericidal potency of the serum*

Upon administration of 5 gamma of the active substance, the $Q_{SB}$-value after 16 hours amounted to 0.5 and after 24 hours, the $Q_{SB}$-value was 0.5.

(d) *Infection test*

10 mice were treated intraperitoneally with 20 gamma of the substance obtained according to (b) in 0.5 cc. of water and after 24 hours they were infected intravenously with *Staphylococcus aureus*. The control animals were given the same amount of physiological salt solution.

Table III shows the survival rate of the treated animals in comparison with that of untreated control animals.

TABLE 3

[Survival rate of mice in the infection test]

| Days after infection | Number of surviving animals treated with 2 gamma of the substance obtained according to (b) | Untreated control animals |
| --- | --- | --- |
| 0 | 10 | 10 |
| 1 | 10 | 10 |
| 2 | 10 | 7 |
| 3 | 9 | 7 |
| 4 | 8 | 7 |
| 5 | 8 | 6 |
| 6 | 8 | 6 |
| 7 | 8 | 5 |
| 8 | 8 | 5 |
| 9 | 8 | 5 |
| 10 | 8 | 5 |
| 11 | 8 | 5 |
| 12 | 8 | 4 |
| 13 | 8 | 4 |
| 14 | 8 | 4 |
| 15 | 7 | 4 |
| 16 | 7 | 4 |
| 17 | 7 | 4 |

(e) *Pyrogenicity*

The preparation obtained according to (b) is non-pyrogenic in rabbits at 100 gamma/kg. i.v.

(f) *Toxicity*

A toxicity of the preparation could not be found. The $LD_{50}$ in the mouse is above 5 g./kg.

EXAMPLE 4

(a) *Cultivation of an apathogenic Clostridium strain*

α-*Prestage culture*.—Erlenmeyer flasks having a capacity of 500 cc. were charged with a nutrient solution consisting of

|  | Percent |
| --- | --- |
| Cane sugar | 0.5 |
| Casein peptone | 2 |
| Meat extract | 0.1 |
| L-lysine | 0.05 |
| NaCl | 0.25 | pH-value=7.0.

and sterilized in an autoclave. After cooling, 0.1% of sodium ascorbate, dissolved in distilled water and filtered under sterile conditions through a Seitz filter, was added in order to reduce the Redox potential. The solution was then inoculated with spores of *Clostridium acetobutyricum* and incubated for 120 hours at 37° C. The extent of spore formation was then about 85%. The vegetative bacteria were then destroyed by heating for half an hour to 80° C.

β-*Mainstage culture*.—Fermenters charged with 15 liters of the following nutrient solution

|  | Percent |
| --- | --- |
| Casein peptone | 2 |
| Meat extract | 0.1 |
| L-lysine | 0.05 |
| KCl | 0.25 |
| $FeSO_4$ | 0.006 | were inoculated as described in Example 2 with the spores. Then, 0.5% of cane sugar, separately dissolved in distilled water and sterilized in an autoclave, and 0.05% of ascorbic acid, dissolved in distilled water and filtered under sterile conditions through a bacterial filter, were added. After incubation for 7 days at 37° C., 90% of the bacteria had formed spores, so that the solution could be harvested.

(b) *Recovery of the active substances*

15 liters of Clostridia culture were centrifuged and filtered. The clear filtrate was concentrated under reduced pressure to about 500 cc. and then dialyzed for 3 days under toluene against flowing distilled water. The dialyzed culture solution was then concentrated under reduced pressure to 150 cc. and combined, while stirring, with 750 cc. of ethanol. The precipitate was again dissolved in 150 cc. of water, combined while stirring with 750 cc. of ethanol and centrifuged. Both alcohol solutions were combined and concentrated under reduced pressure. The oil was dissolved in 150 cc. of water and combined, while stirring, with 15 l. of acetone and then centrifuged. The centrifuged precipitate was washed with ether and dried in an exsiccator. Yield: 10.7 g.

(c) *Test for the bactericidal potency of the serum*

After administration of 5 gamma of active substance, the $Q_{SB}$-value was 0.5 after 16 hours and after 24 hours it was 0.5.

(d) *Infection test*

10 mice were treated intraperitoneally with 20 gamma of the substance obtained according to (b), dissolved in 0.5 cc. of physiological salt solution and after 24 hours they were infected by intravenous injection of *Staphylococcus aureus*. The control animals were given the same amount of physiological salt solution.

Table 4 shows the survival rate of the treated animals in comparison with that of untreated control animals.

TABLE 4

[Survival rate of mice in the infection test]

| Days after infection | Number of surviving animals treated with 20 gamma of the substance obtained according to (b) | Untreated control animals |
| --- | --- | --- |
| 0 | 10 | 10 |
| 1 | 10 | 10 |
| 2 | 10 | 7 |
| 3 | 9 | 7 |
| 4 | 9 | 7 |
| 5 | 9 | 6 |
| 6 | 9 | 6 |
| 7 | 9 | 5 |
| 8 | 8 | 5 |
| 9 | 8 | 5 |
| 10 | 8 | 5 |
| 11 | 7 | 5 |
| 12 | 6 | 4 |
| 13 | 6 | 4 |
| 14 | 6 | 4 |
| 15 | 6 | 4 |
| 16 | 6 | 4 |
| 17 | 6 | 4 |

(e) *Pyrogenicity*

The preparation obtained according to (b) is non-pyrogenic in rabbits at 100 gamma/kg. i.v.

We claim:
1. A process for preparing alcohol-soluble high molecular weight microbial products which comprises preparing a sterile culture filtrate containing said high molecular weight products from a culture of an apathogenic anaerobic Clostridium strain selected from the group consisting of *Clostridium butyricum, Clostridium tyrobutyricum, Clostridium acetobutyricum,* and *Clostridium pectinovorum,* and then separating said high molecular weight products from the culture filtrate.
2. A process as claimed in claim 1 wherein said Clostridium strain is cultivated for a period of 3–21 days at a temperature in the range of 20 and 40° C., in a nutrient medium containing ascorbic acid.
3. A process as claimed in claim 1 wherein said Clostridium strain is cultivated for a period of 3–21 days at a temperature in the range of 20 and 40° C., in a nutrient medium containing iron nails.
4. A process as claimed in claim 1 wherein said Clostridium strain is cultivated for a period of 3–21 days at a temperature in the range of 20 and 40° C., in a nutrient medium through which nitrogen is passed.
5. The process as in claim 1 wherein said high molecular weight microbial products are separated from the culture filtrate by dialysis.
6. A process as claimed in claim 5, wherein the high molecular weight microbial products obtained from the culture filtrates by dialysis are further purified by adding to an aqueous solution of the said products a lower aliphatic alcohol which is miscible with water, rejecting the precipitate obtained and isolating the substances by concentration of the alcohol solution.
7. A process as claimed in claim 5, wherein the high molecular weight microbial products obtained by dialysis from the culture filtrates are isolated from their aqueous solutions by precipitation with a water-soluble ketone.
8. The process as in claim 1 wherein said high molecular weight microbial products are separated from the culture filtrate by solvent precipitation.
9. A pharmaceutical preparation comprising an alcohol-soluble high molecular weight microbial product prepared according to claim 1 in admixture with a pharmaceutical carrier material.
10. A preparation as in claim 9 which is an injectable solution.
11. A preparation as in claim 9 which is an injectable aqueous solution.
12. A method for enhancing the unspecific resistance of an animal organism which comprises administering to said organism an effective amount of an alcohol-soluble high molecular weight microbial product prepared according to claim 1 in admixture with a pharmaceutical carrier material.

References Cited by the Examiner

UNITED STATES PATENTS 3,119,741  1/1964  Freedman et al. _____ 167—78

FOREIGN PATENTS 886,597  11/1959  Great Britain.

OTHER REFERENCES

Porter: Bacterial Chemistry and Physiology, published by John Wiley and Sons, Inc., New York, 1946, pp. 624, and 630–634.

A. LOUIS MONACELL, *Primary Examiner.*

D. M. STEPHENS, *Assistant Examiner.*